United States Patent
Bolton

(10) Patent No.: US 12,153,773 B1
(45) Date of Patent: Nov. 26, 2024

(54) TECHNIQUES FOR MANIPULATING COMPUTER-GENERATED OBJECTS

(71) Applicant: Apple Inc., Cupertino, CA (US)

(72) Inventor: Adam Bolton, La Pine, OR (US)

(73) Assignee: Apple Inc., Cupertino, CA (US)

( * ) Notice: Subject to any disclaimer, the term of this patent is extended or adjusted under 35 U.S.C. 154(b) by 102 days.

(21) Appl. No.: 17/239,257

(22) Filed: Apr. 23, 2021

Related U.S. Application Data

(60) Provisional application No. 63/016,231, filed on Apr. 27, 2020.

(51) Int. Cl.
*G06F 3/04815* (2022.01)
*G06F 3/0484* (2022.01)

(52) U.S. Cl.
CPC ........ *G06F 3/04815* (2013.01); *G06F 3/0484* (2013.01)

(58) Field of Classification Search
CPC ............................ G06F 3/04815; G06F 3/0484
See application file for complete search history.

(56) References Cited

U.S. PATENT DOCUMENTS

| | | | | |
|---|---|---|---|---|
| 5,861,889 A * | 1/1999 | Wallace | ............. | G06F 3/04845 345/619 |
| 6,128,631 A | 10/2000 | Wallace et al. | | |
| 6,308,144 B1 | 10/2001 | Bronfeld et al. | | |
| 6,426,745 B1 * | 7/2002 | Isaacs | ................. | G06F 3/04845 345/619 |
| 6,496,870 B1 * | 12/2002 | Faustini | .................. | G06F 9/542 717/107 |
| 6,781,597 B1 * | 8/2004 | Vrobel | .................... | G06T 19/20 715/848 |
| 10,318,034 B1 | 6/2019 | Hauenstein et al. | | |
| 10,671,241 B1 | 6/2020 | Jia et al. | | |
| 2001/0042118 A1 | 11/2001 | Miyake et al. | | |
| 2002/0149628 A1 * | 10/2002 | Smith | ................. | G06F 3/04815 715/848 |
| 2003/0187532 A1 | 10/2003 | Charles et al. | | |
| 2005/0108620 A1 * | 5/2005 | Allyn | .................. | G06F 3/04845 715/255 |
| 2005/0188348 A1 * | 8/2005 | Han | ........................ | G06T 17/10 717/113 |
| 2006/0025679 A1 * | 2/2006 | Viswanathan | ......... | A61B 34/20 715/730 |

(Continued)

OTHER PUBLICATIONS

Non-Final Office Action received for U.S. Appl. No. 17/239,425, mailed on Jan. 12, 2022, 32 pages.

(Continued)

*Primary Examiner* — Matthew Ell
*Assistant Examiner* — Alvaro R Calderon, IV
(74) *Attorney, Agent, or Firm* — Kubota & Basol LLP

(57) ABSTRACT

Computer generated objects can be associated with a plurality of bookmarked pins. In some embodiments, one pin of the plurality of bookmarked pins can be designated as an object origin and one or more other pins of the plurality of bookmarked pins can be used for other actions during editing in the computer graphics editing environment. For example, the one or more other pins can be used as a temporary locus of manipulation (e.g., for rotation, movement, resizing, etc.). The plurality of bookmarked pins can be selectable to display a manipulator element corresponding to a selected pin.

23 Claims, 9 Drawing Sheets

(56) References Cited

U.S. PATENT DOCUMENTS

| | | |
|---|---|---|
| 2006/0041178 A1 | 2/2006 | Viswanathan et al. |
| 2007/0271524 A1 | 11/2007 | Chiu et al. |
| 2009/0079739 A1* | 3/2009 | Fitzmaurice ........ G06F 3/04815 345/427 |
| 2011/0041098 A1 | 2/2011 | Kajiya et al. |
| 2012/0026100 A1 | 2/2012 | Migos et al. |
| 2012/0078589 A1 | 3/2012 | Mcdaniel |
| 2012/0086719 A1 | 4/2012 | Brown |
| 2012/0262458 A1 | 10/2012 | Fowler et al. |
| 2013/0093756 A1* | 4/2013 | Davidson ................ G06T 19/20 345/419 |
| 2013/0127833 A1* | 5/2013 | Davidson ................ G06T 19/20 345/419 |
| 2013/0135290 A1* | 5/2013 | Davidson ............ G06F 3/04815 345/419 |
| 2013/0135291 A1* | 5/2013 | Davidson ............ G06F 3/04883 345/419 |
| 2013/0318479 A1* | 11/2013 | Porwal ................ G06F 3/04815 715/849 |
| 2014/0040832 A1* | 2/2014 | Regelous ............ G06F 3/04815 715/849 |
| 2014/0104266 A1 | 4/2014 | Stone et al. |
| 2014/0129990 A1* | 5/2014 | Xin ....................... G06F 3/0425 715/849 |
| 2014/0146039 A1* | 5/2014 | Duplessis ................ G06T 19/20 345/419 |
| 2014/0149944 A1* | 5/2014 | Duplessis ........... G06F 3/04815 715/849 |
| 2014/0229871 A1* | 8/2014 | Tai ..................... G06F 3/04845 715/765 |
| 2014/0344741 A1 | 11/2014 | Newman |
| 2016/0092080 A1 | 3/2016 | Swanson et al. |
| 2017/0329488 A1* | 11/2017 | Welker ................ G06F 3/04842 |
| 2018/0113596 A1* | 4/2018 | Ptak .................... G06F 3/04815 |
| 2019/0294314 A1 | 9/2019 | Tada et al. |
| 2020/0082633 A1* | 3/2020 | Rom ........................ G06T 17/10 |
| 2020/0258193 A1* | 8/2020 | Katsumata .............. G06T 11/00 |
| 2020/0272303 A1* | 8/2020 | Jia .......................... G06F 3/011 |
| 2020/0319776 A1* | 10/2020 | Natzke ................ G06F 3/04845 |
| 2020/0379626 A1 | 12/2020 | Guyomard et al. |
| 2021/0134069 A1* | 5/2021 | Sorrento ................. G06F 3/017 |
| 2021/0150731 A1* | 5/2021 | Saquib .................. G06T 19/006 |

OTHER PUBLICATIONS

Mendes et al., "A Survey on 3D Virtual Object Manipulation: from the Desktop to Immersive Virtual Environments", Survey on 3D Virtual Object Manipulation, Apr. 2018, 26 pages.

Caputo et al., "The Smart Pin: An effective tool for object manipulation in immersive virtual reality environments", Department of Computer Science, vol. 74, May 28, 2018, pp. 225-233.

Gloumeau et al., "PinNPivot: Object Manipulation Using Pins in Immersive Virtual Environments", IEEE Transactions on Visualization and Computer Graphics, Apr. 15, 2020, 17 pages.

Song et al., "A Handle Bar Metaphor for Virtual Object Manipulation with Mid-Air Interaction", May 5-10, 2012, 10 pages.

Apple, "Creating 3D Content with Reality Composer", Available online at: <https://developer.apple.com/documentation/realitykit/creating_3d_content_with_reality_composer>, Accessed on Jul. 23, 2021, 10 pages.

Autocad, "Rotate 3D Objects", Available online at: <http://docs.autodesk.com/ACD/2010/ENU/AutoCAD%202010%20User%20Documentation/index.html?url=WS1a9193826455f5ffa23ce210c4a30acaf-66f8.htm, topicNumber=d0e103038>, 2010, 1 page.

Rhinoceros, "Gumball", Available online at: <https://docs.mcneel.com/rhino/6/help/en-us/commands/gumball.htm>, Accessed on Jul. 23, 2021, 9 pages.

Rhinoceros, "Object Snaps", Available online at: <http://docs.mcneel.com/rhino/5/help/en-us/user_interface/object_snaps.htm>, Accessed on Jul. 23, 2021, 15 pages.

Rhinoceros, "Rotate3D", Available online at: <http://docs.mcneel.com/rhino/5/help/en-us/commands/rotate3d.htm> Accessed on Jul. 23, 2021, 1 page.

Final Office Action received for U.S. Appl. No. 17/239,425, mailed on Jan. 17, 2024, 51 pages.

* cited by examiner

TECHNIQUES FOR MANIPULATING COMPUTER-GENERATED OBJECTS

CROSS-REFERENCE TO RELATED APPLICATION

This application claims the benefit of U.S. Provisional Application No. 63/016,231, filed on Apr. 27, 2020, the entire disclosure of which is incorporated herein by reference in its entirety for all purposes.

FIELD OF THE DISCLOSURE

This relates generally to computer graphics editors.

BACKGROUND OF THE DISCLOSURE

Computer-generated reality environments are environments where at least some objects displayed for a user's viewing are generated using a computer. In some uses, a user may create or modify computer-generated reality environments, such as by manipulating computer-generated objects in a computer graphics editor or editing environment. Editors that allow for intuitive editing of computer-generated objects are desirable.

SUMMARY OF THE DISCLOSURE

Some embodiments described in this disclosure are directed to computer generated objects associated with a plurality of bookmarked pins. In some embodiments, one pin of the plurality of bookmarked pins can be designated as an object origin (e.g., for run-time physics interactions of the object) and one or more other pins of the plurality of bookmarked pins can be used for other actions during scene editing in the computer graphics editing environment. For example, the one or more other pins can be used as a temporary locus of manipulation (e.g., for rotation, movement, resizing, etc.). The plurality of bookmarked pins can be selectable to display a manipulator element corresponding to a selected pin. The full descriptions of the embodiments are provided in the Drawings and the Detailed Description, and it is understood that this Summary does not limit the scope of the disclosure in any way.

BRIEF DESCRIPTION OF THE DRAWINGS

For a better understanding of the various described embodiments, reference should be made to the Detailed Description below, in conjunction with the following drawings in which like reference numerals often refer to corresponding parts throughout the figures.

DETAILED DESCRIPTION

Figure 1:
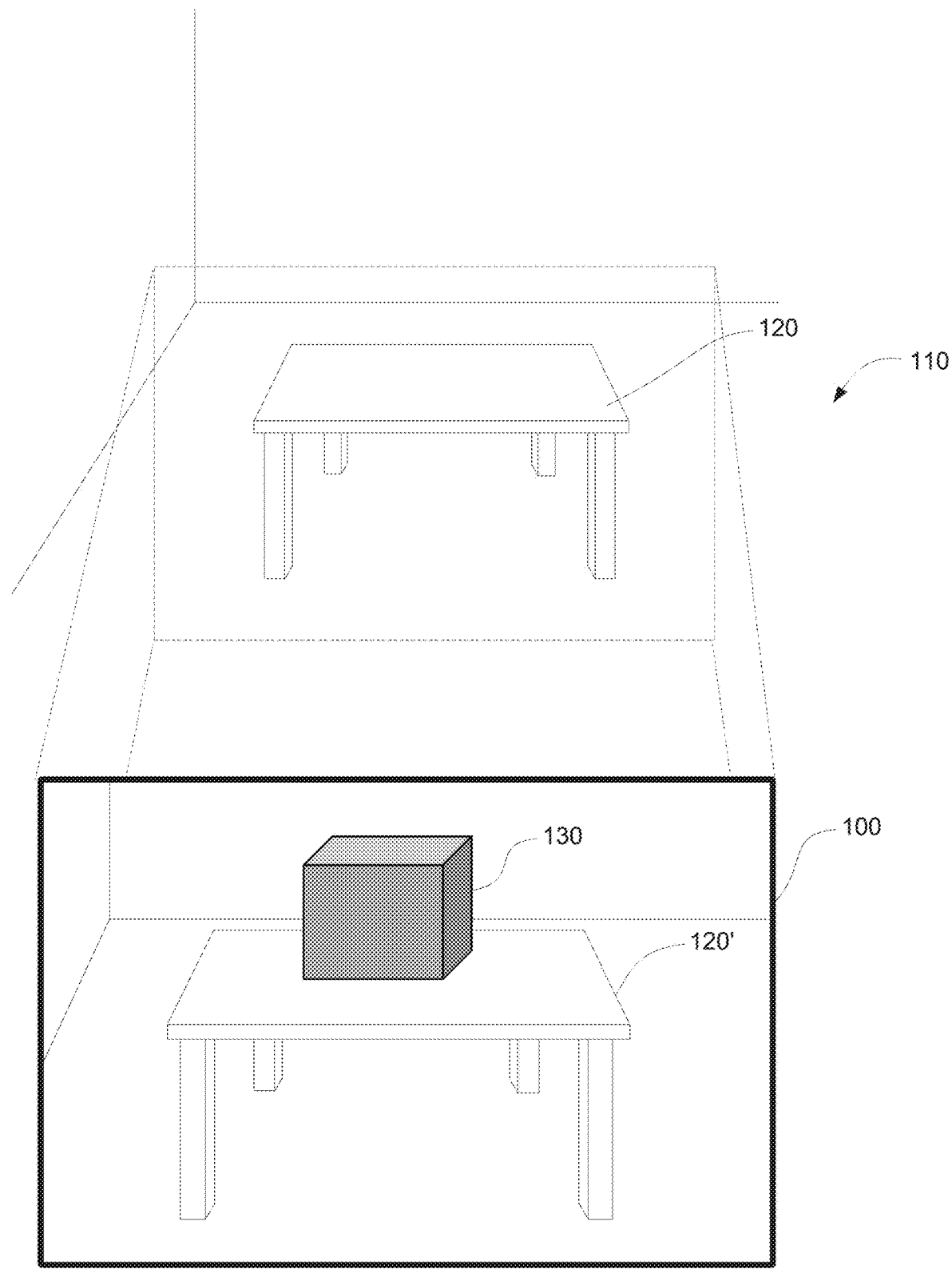
FIG. 1 illustrates an electronic device displaying CGR content according to some embodiments of the disclosure.

In the following description of embodiments, reference is made to the accompanying drawings which form a part hereof, and in which it is shown by way of illustration specific embodiments that are optionally practiced. It is to be understood that other embodiments are optionally used and structural changes are optionally made without departing from the scope of the disclosed embodiments. Further, although the following description uses terms "first," "second," etc. to describe various elements, these elements should not be limited by the terms. These terms are only used to distinguish one element from another. For example, a first object or first pin could be termed a second object or second pin, and, similarly, a second object or second pin could be termed a first object or first pin, without departing from the scope of the various described embodiments. The first object and the second object are both objects, but they are not the same object. Likewise, the first pin and the second pin are both pins, but they are not the same pin.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

A physical environment (e.g., also referred to as "real-world environment") refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In some embodiments of a CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect the device turning and/or moving and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands). Examples of CGR include virtual reality, mixed reality, and augmented reality.

In some embodiments, CGR content can be presented to the user via a CGR file that includes data representing the CGR content and/or data describing how the CGR content is to be presented. In some embodiments, the CGR file includes data representing one or more CGR scenes and one or more triggers for presentation of the one or more CGR scenes. For example, a CGR scene may be anchored to a horizontal, planar surface, such that when a horizontal, planar surface is detected (e.g., in the field of view of one or more cameras), the CGR scene can be presented. The CGR file can also include data regarding one or more objects associated with the CGR scene, and/or associated triggers and actions involving the CGR objects.

In order to simplify the generation of CGR files and/or edit computer-generated graphics generally, a computer graphics editor including a content creation graphical user interface (GUI) can be used. In such a content creation graphical user interface, a user can create objects from scratch (including the appearance of the objects, behaviors/actions of the objects, and/or triggers for the behaviors/actions of the objects). Additionally or alternatively, objects can be created by other content creators and imported into the graphical user interface, where the objects can be placed into a CGR environment or scene.

In some embodiments, the content creation GUI can include one or more graphical user interface elements to enable one or more transformations of an object. A graphical user interface element to transform an object can be referred to herein as a "manipulator" or "manipulator element." The manipulator can be used to perform move, rotate or scale actions on the object. In some embodiments, the manipulator can provide multiple elements to enable multiple transformation actions. In some embodiments, the manipulator can provide the ability to perform move, rotate and scale actions on the object (e.g., as described herein with respect to manipulators). The manipulator can be anchored to a pin corresponding to the origin of the object. As described herein, the manipulator may be anchored to other pins associated with an object.

In some embodiments, as described herein, to simplify interactions and improve productivity, an object can include a plurality of bookmarked pins. The bookmarked pins can be selectable pins that can be used as anchor points for the manipulator. As a result, various transformations can be quickly implemented using the manipulator anchored temporarily to different points without being limiting to transformations using a manipulator anchored to the pin at the object origin and/or without having to manually relocate the pin/manipulator to a different locus for transformation. The bookmarked pins can be created and managed in the content creation GUI and/or can be imported into the content creation GUI with the object.

Embodiments of electronic devices and user interfaces for such devices are described. In some embodiments, the device is a portable communications device, such as a laptop or tablet computer. In some embodiments, the device is a mobile telephone that also contains other functions, such as personal digital assistant (PDA) and/or music player functions. It should also be understood that, in some embodiments, the device is not a portable communications device, but is a desktop computer or a television. In some embodiments, the portable and non-portable electronic devices may optionally include with touch-sensitive surfaces (e.g., touch screen displays and/or touch pads). In some embodiments, the device does not include a touch-sensitive surface (e.g., a touch screen display and/or a touch pad), but rather is capable of outputting display information (such as the user interfaces of the disclosure) for display on a separate display device, and capable of receiving input information from a separate input device having one or more input mechanisms (such as one or more buttons, a mouse, a touch screen display and/or a touch pad). In some embodiments, the device has a display, but is capable of receiving input information from a separate input device having one or more input mechanisms (such as one or more buttons, a mouse, a touch screen display and/or a touch pad).

In the discussion that follows, an electronic device that includes a display and a touch-sensitive surface is described. It should be understood, however, that the electronic device optionally includes one or more other physical user-interface devices, such as a physical keyboard, a mouse and/or a joystick. Further, as described above, it should be understood that the described electronic device, display and touch-sensitive surface are optionally distributed amongst two or more devices. Therefore, as used in this disclosure, information displayed on the electronic device or by the electronic device is optionally used to describe information outputted by the electronic device for display on a separate display device (touch-sensitive or not). Similarly, as used in this disclosure, input received on the electronic device (e.g., touch input received on a touch-sensitive surface of the electronic device) is optionally used to describe input received on a separate input device, from which the electronic device receives input information.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, a television channel browsing application, and/or a digital video player application. Additionally, the device may support an application for content creation for computer generated graphics and/or CGR environments.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

FIG. 1 illustrates an electronic device 100 displaying CGR content according to some embodiments of the disclosure. In some embodiments, electronic device 100 is a hand-held or mobile device, such as a tablet computer, laptop computer or a smartphone. Examples of device 100 are described below with reference to FIG. 2. As shown in FIG. 1, electronic device 100 and table 120 are located in the physical environment 110. In some embodiments, electronic device 100 may be configured to capture areas of physical environment 110 including table 120 (illustrated in the field of view of electronic device 100). In some embodiments, in response to a trigger, the electronic device 100 may be configured to display a 3D CGR object 130 (e.g., a cube illustrated in FIG. 1) positioned on top of a CGR representation 120' of real-world table 120. For example, object 130 can be displayed on the surface of the table 120' in the CGR environment displayed on device 100 in response to detecting the planar surface of table 120 in the physical environment 110. A user may desire to create content for a CGR environment such as a CGR scene including multiple objects. CGR content can be created in a content creation graphical user interface (GUI) running on device 100 or another electronic device. The examples described herein describe systems and methods of implementing improved content creation using bookmarked pins.

Figure 2:
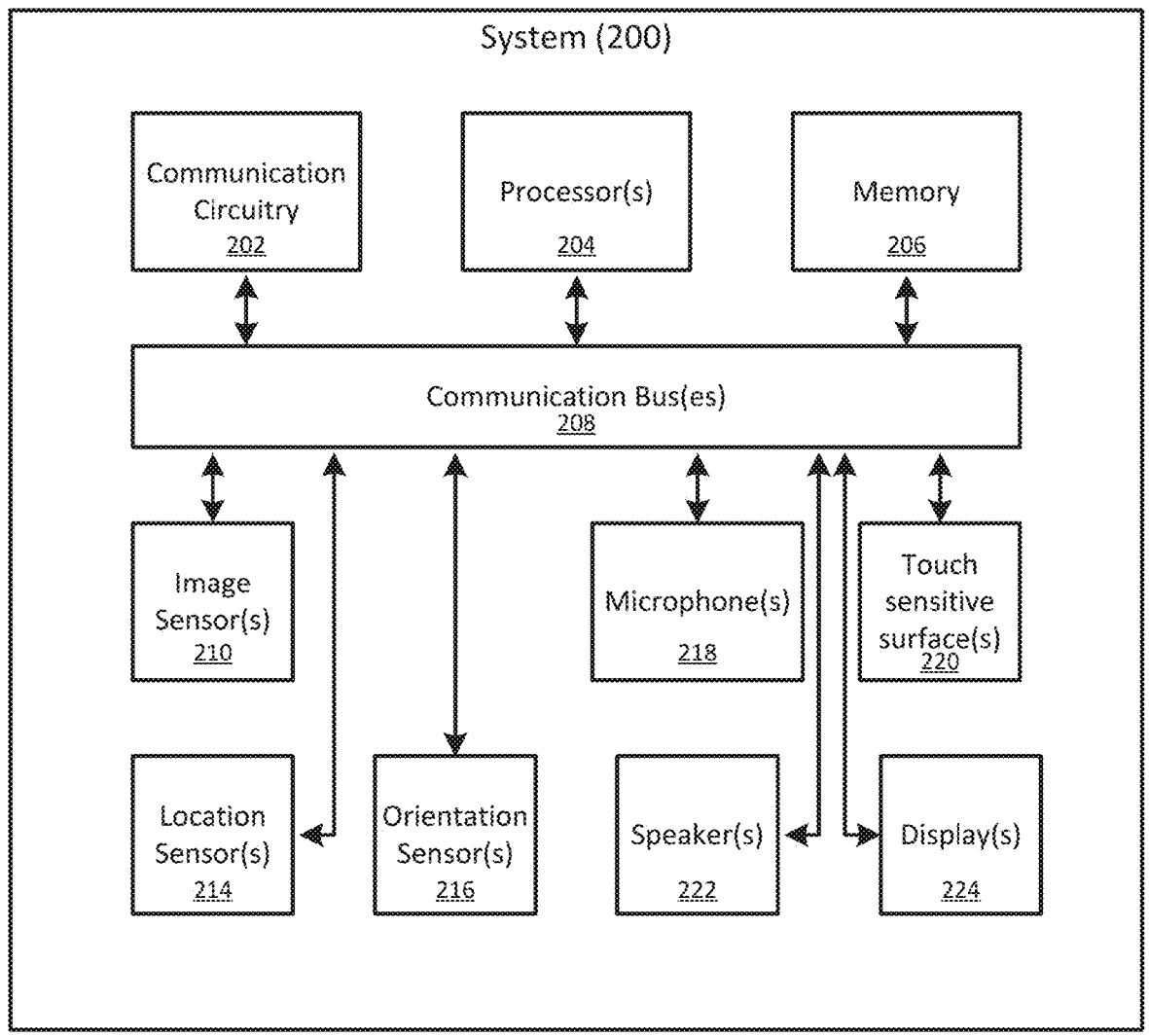
FIG. 2 illustrates a block diagram of exemplary architectures for an electronic device according to some embodiments of the disclosure.

FIG. 2 illustrates a block diagram of exemplary architectures for a system or device 200 in accordance with some embodiments. In some embodiments, device 200 is a mobile device, such as a mobile phone (e.g., smart phone), a tablet computer, a laptop computer, a desktop computer, an auxiliary device in communication with another device, etc. In some embodiments, as illustrated in FIG. 2, device 200 includes various components, such as communication circuitry 202, processor(s) 204, memory 206, image sensor(s) 210, location sensor(s) 214, orientation sensor(s) 216, microphone(s) 218, touch-sensitive surface(s) 220, speaker(s) 222, and/or display(s) 224. These components optionally communicate over communication bus(es) 208 of device 200.

Device 200 includes communication circuitry 202. Communication circuitry 202 optionally includes circuitry for communicating with electronic devices, networks, such as the Internet, intranets, a wired network and/or a wireless network, cellular networks and wireless local area networks (LANs). Communication circuitry 202 optionally includes circuitry for communicating using near-field communication and/or short-range communication, such as Bluetooth®.

Processor(s) 204 include one or more general processors, one or more graphics processors, and/or one or more digital signal processors. In some embodiments, memory 206 is a non-transitory computer-readable storage medium (e.g., flash memory, random access memory) that stores computer-readable instructions configured to be executed by processor(s) 204 to perform the techniques, processes, and/or methods described below (e.g., with reference to FIGS. 3-8B). In some embodiments, memory 206 can including more than one non-transitory computer-readable storage medium. A non-transitory computer-readable storage medium can be any medium (e.g., excluding a signal) that can tangibly contain or store computer-executable instructions for use by or in connection with the instruction execution system, apparatus, or device. In some embodiments, the storage medium is a transitory computer-readable storage medium. In some embodiments, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like.

Device 200 includes display(s) 224 (or display generation component(s)). In some embodiments, display(s) 224 include a single display. In some embodiments, display(s) 224 includes multiple displays. In some embodiments, device 200 includes touch-sensitive surface(s) 220 for receiving user inputs, such as tap inputs and swipe inputs or other gestures. In some embodiments, display(s) 224 and touch-sensitive surface(s) 220 form touch-sensitive display(s) (e.g., a touch screen integrated with device 200 or external to device 200 that is in communication with device 200).

Device 200 optionally includes image sensor(s) 210. Image sensors(s) 210 optionally include one or more visible light image sensor, such as charged coupled device (CCD) sensors, and/or complementary metal-oxide-semiconductor (CMOS) sensors operable to obtain images of physical objects from the real environment. Image sensor(s) 210 also optionally include one or more infrared (IR) sensor(s), such as a passive IR sensor or an active IR sensor, for detecting infrared light from the real environment. For example, an active IR sensor includes an IR emitter, such as an IR dot emitter, for emitting infrared light into the real environment. Image sensor(s) 210 also optionally include one or more event camera(s) configured to capture movement of physical objects in the real environment. Image sensor(s) 210 also optionally include one or more depth sensor(s) configured to detect the distance of physical objects from device 200. In some embodiments, information from one or more depth sensor(s) can allow the device to identify and differentiate objects in the real environment from other objects in the real environment. In some embodiments, one or more depth sensor(s) can allow the device to determine the texture and/or topography of objects in the real environment.

In some embodiments, device 200 uses CCD sensors, event cameras, and depth sensors in combination to detect the physical environment around device 200. In some embodiments, image sensor(s) 220 include a first image sensor and a second image sensor. The first image sensor and the second image sensor work in tandem and are optionally configured to capture different information of physical objects in the real environment. In some embodiments, the first image sensor is a visible light image sensor and the second image sensor is a depth sensor. In some embodiments, device 200 uses image sensor(s) 210 to detect the position and orientation of device 200 and/or display(s) 224 in the real environment. For example, device 200 uses image sensor(s) 210 to track the position and orientation of display(s) 224 relative to one or more fixed objects in the real environment.

In some embodiments, device 200 includes microphones(s) 218. Device 200 uses microphone(s) 218 to detect sound from the user and/or the real environment of the user. In some embodiments, microphone(s) 218 includes an array of microphones (including a plurality of microphones) that optionally operate in tandem, such as to identify ambient noise or to locate the source of sound in space of the real environment.

Device 200 includes location sensor(s) 214 for detecting a location of device 200 and/or display(s) 224. For example, location sensor(s) 214 can include a GPS receiver that receives data from one or more satellites and allows device 200 to determine the device's absolute position in the physical world.

Device 200 includes orientation sensor(s) 216 for detecting orientation and/or movement of device 200 and/or display(s) 224. For example, device 200 uses orientation sensor(s) 216 to track changes in the position and/or orientation of device 200 and/or display(s) 224, such as with respect to physical objects in the real environment. Orientation sensor(s) 216 optionally include one or more gyroscopes and/or one or more accelerometers.

Device 200 is not limited to the components and configuration of FIG. 2, but can include other or additional components in multiple configurations.

Figure 3:
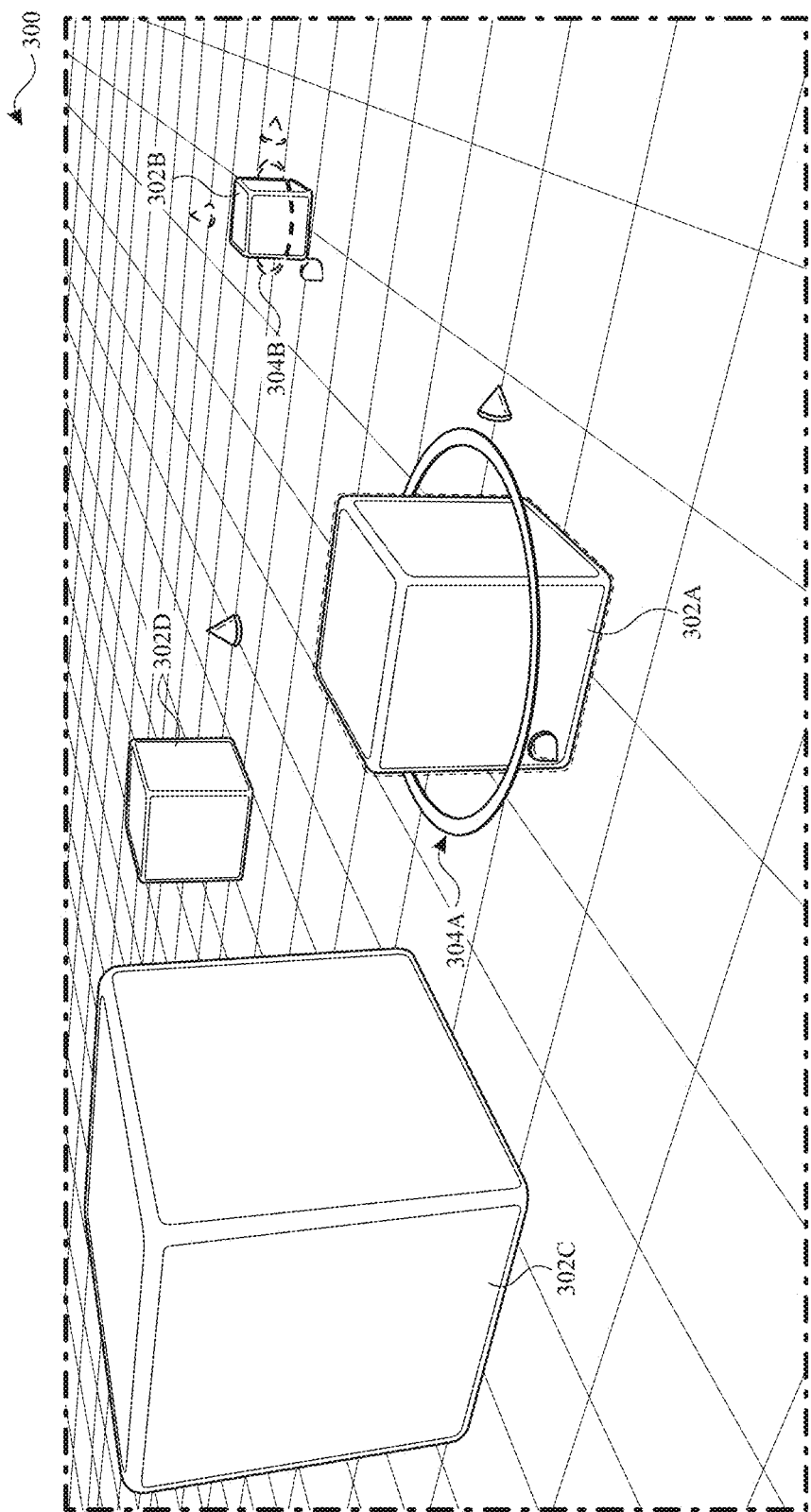
FIG. 3 illustrates an example view of a content creation graphical user interface (GUI) including one or more objects according to some embodiments of the disclosure.

Attention is now directed towards examples of graphics user interfaces ("GUIs") and associated processes that are implemented on an electronic device, such as electronic device 100 or device 200. The GUIs can be part of a computer graphics editor that may include a display of a computer graphics editing environment. FIG. 3 illustrates an example view 300 of a content creation GUI including one or more objects according to some embodiments of the disclosure. Content creation GUI can be displayed on an electronic device (e.g., similar to device 100 or 200) including, but not limited to, portable or non-portable computing devices such as a tablet computing device, laptop computing device or desktop computing device. View 300 illustrates a three dimensional (3D) environment including one or more objects in a first mode of operation (e.g., a scene editing mode). For example, FIG. 3 includes objects 302A-302D represented as cubes. It should be understood that the cubes are representative and one or more different objects (e.g., 1D, 2D or 3D objects) can be included in the 3D environment. Additionally, it should be understood, that the 3D environment (or 3D object) described herein may be a representation of a 3D environment (or 3D object) displayed in a two dimensional (2D) context (e.g., displayed on a 2D screen). In some embodiments, the 3D environment can display gridlines (as shown) or other indicators to assist a content creator with placement and/or size of an object in the 3D environment. As shown in view 300, the GUI can also display a manipulator to enable transformations of a selected object. For example, view 300 shows object 302A as the selected object, and manipulator 304A displayed anchored to an origin of object 302A (e.g., to the geometric center of the cube). When a different object is selected, the manipulator can be displayed anchored to an origin of a different selected object. For example, selection of object 302B can be accompanied by the display of manipulator 304B anchored to an origin of object 302B. In some embodiments, when a single object is selected a single manipulator is displayed corresponding to the selected object (ceasing to display the manipulator with respect to any other object).

The manipulator, such as manipulators 304A-304B, can include, in some embodiments, a ring and three arrows (shown as cones in FIG. 3). In some embodiments, actuating or translating of one of the arrows can result in movement of the object along the corresponding axis. In some embodiments, clicking inside the ring and translating can result in movement of the object along the plane defined by the ring. Additionally, the rotating the ring (e.g., using a click-and-drag operation) can rotate the object axially from the anchor of the object and pulling the ring perpendicular to the ring can scale the object (up or down depending on the direction). Thus, the ring/arrows of the manipulator can provide for 3D translation, rotation and scaling in the 3D environment.

Figure 4:
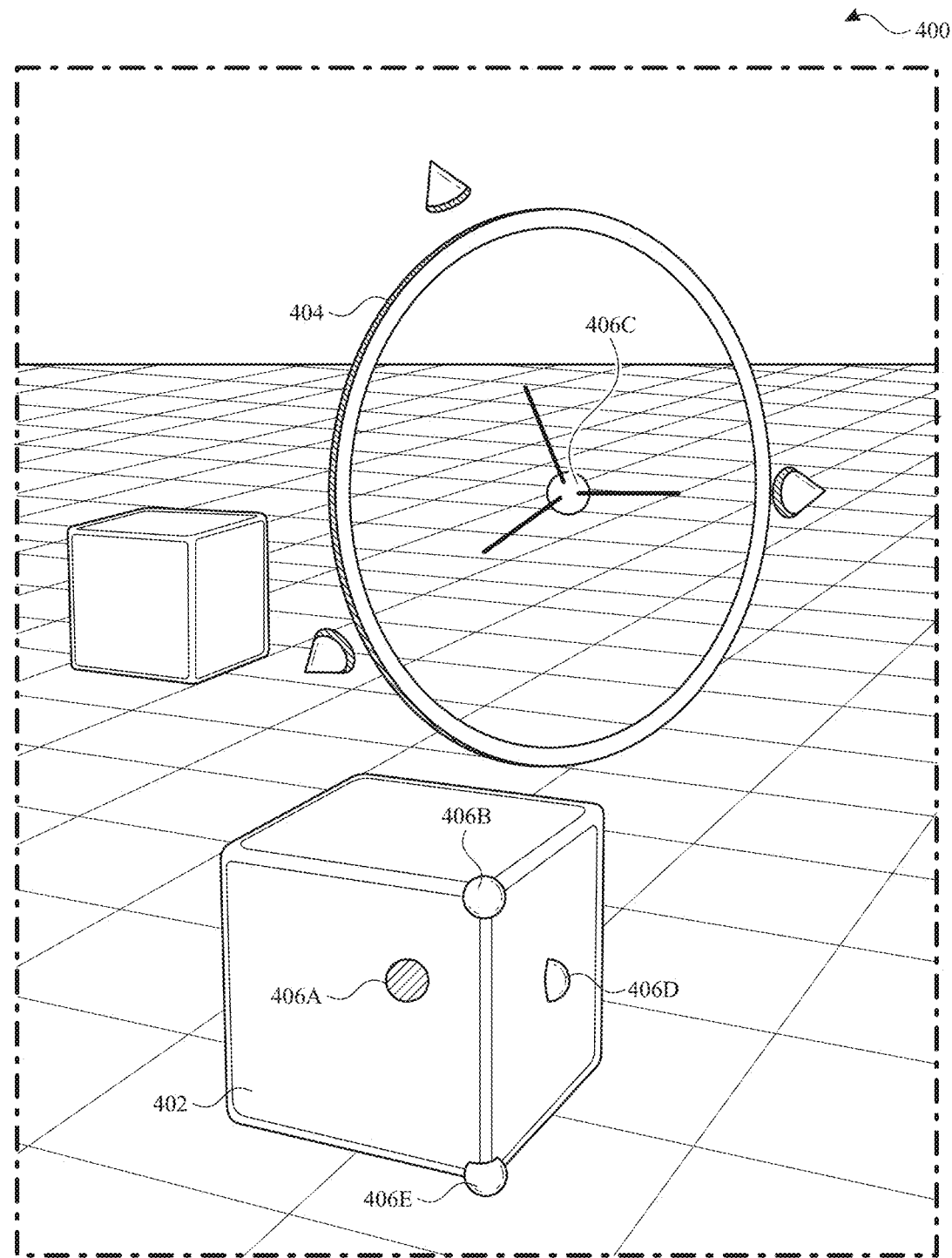
FIG. 4 illustrates an example view of a content creation GUI including an object associated with multiple pins according to some embodiments of the disclosure.

As described herein, to simplify interactions and improve productivity in a content creation GUI, an object for use in a CGR scene (e.g., virtual/augmented/mixed reality) can include a plurality of bookmarked pins. It should be understood that objects associated with a plurality of bookmarked pins could be used for content creation in other contexts aside from the CGR scene context (e.g., for any computer generated graphics). FIG. 4 illustrates an example view 400 of a content creation GUI including an object associated with multiple pins according to some embodiments of the disclosure. View 400 illustrates a 3D environment including one or more objects in a second mode of operation (e.g., a pin editing mode), different from the first mode of operation (e.g., a scene editing mode). FIG. 4 illustrates an object 402 (e.g., corresponding to object 302) including multiple associated pins 406A-406E. Object 402 is illustrated as a cube with five associated bookmarked pins. Pin 406A is illustrated at a geometric center of object 402 (internal to object 402), pin 406B is located at a first corner of object 402, pin 406C is located outside object 402, pin 406D is located at the center of a face of object 402 (at the surface of object 402), and pin 406E is located at a second, different corner of object 402. It should understood that in different embodiments different numbers of pins (more or fewer) and different placements of pins are possible. In some embodiments, associated bookmarked pins can be located internal to an object, external to an object, and/or on a surface of the object.

As shown in view 400, a selected pin can be displayed along with a manipulator 404 (e.g., corresponding to manipulator 304A) in the content creation GUI. In some embodiments each pin illustrated in view 400 can have the same appearance. In some embodiments, one or more pins can look different from other pins. In some embodiments, a pin designated object origin (for physics actions in a scene) or a pin at a geometric center of the object may have a different appearance (e.g., different size, shape, color, shading, etc.) than other pins. For example in FIG. 4, pin 406A at the geometric center of object 402 can have a different appearance than pins 406B-E. In some embodiments, one or more imported pins (included with the object) may have a different appearance (e.g., different size, shape, color, shading, etc.) than pins subsequently added in the content creation GUI. In some embodiments, a selected pin may also have a different appearance from the other pins (optionally, in addition to the appearance of manipulator 404). In some embodiments, the selected pin can be highlighted or otherwise different in appearance (e.g., different size, shape, color, shading, etc.).

As mentioned above, view 300 illustrates a view of the 3D environment in a first mode of operation (e.g., scene editing mode) and view 400 illustrates a view of the 3D environment in a second, different mode of operation (e.g., pin editing mode). In some embodiments, pins are illustrated in the pin editing mode (e.g., as shown in FIG. 4) and are not displayed in the scene editing mode (as shown in FIG. 3). In some embodiments, the appearance of the manipulator can be different in the different modes of operation (e.g., different size, shape, color, shading, etc.). For example, FIG. 4 illustrates manipulator 404 with a ring around the base of the directional arrows in pin editing mode with a different appearance than a ring around the base of the direction arrows of manipulator 304A in the scene editing mode (e.g., a different color, shading, etc.). Additionally or alternatively, an outline around the manipulator ring can have a different appearance (e.g., different color, shading, etc.) for manipulator 404 in pin editing mode than for manipulator 304A in scene editing mode. Additionally or alternatively, manipulator 404 in pin editing mode can include axes lines within the manipulator ring indicative of the local orientation of the pin in the 3D environment, whereas manipulator 304A may not display axes lines.

Figures 5A, 5B, 5C:
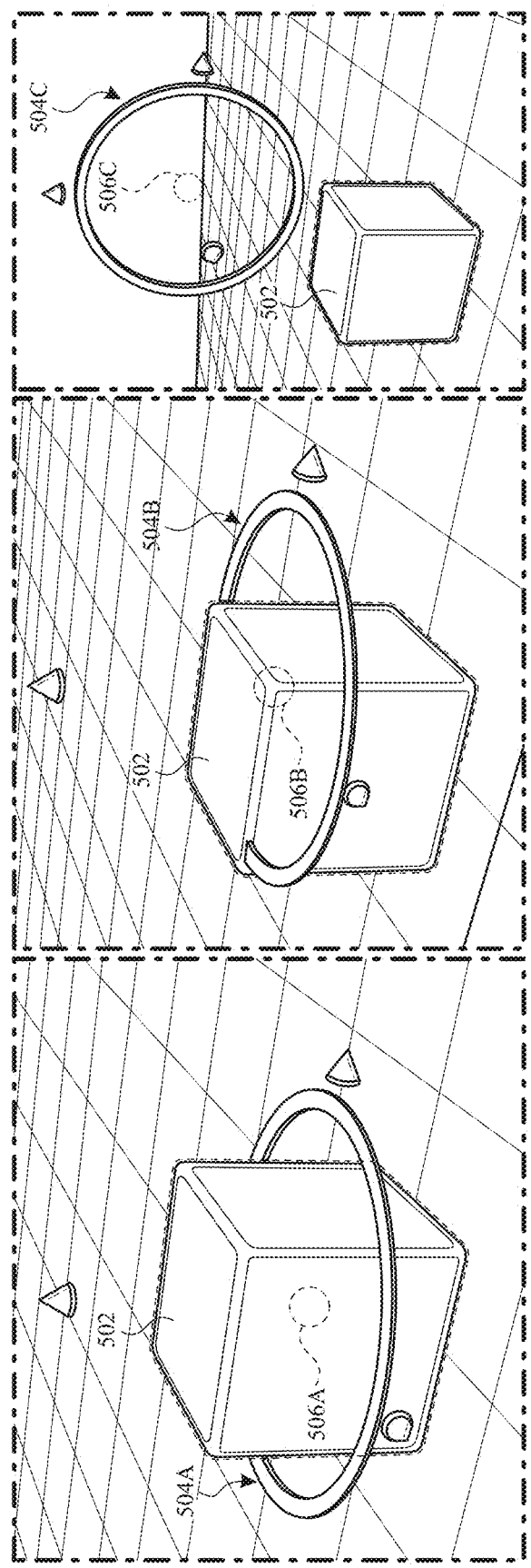
FIGS. 5A-5C illustrate an example object associated with multiple bookmarked pins according to some embodiments of the disclosure.

FIGS. 5A-5C illustrate an example object associated with multiple bookmarked pins according to some embodiments of the disclosure. FIGS. 5A-5C illustrate a 3D environment in a first mode of operation (e.g., a scene editing mode). FIG. 5A illustrates object 502 (e.g., corresponding to object 302, 402) with manipulator 504A (e.g., corresponding to manipulator 304A) anchored to a bookmarked pin at the geometric center of object 502 (e.g., corresponding to pin 406A). FIG. 5B illustrates object 502 with manipulator 504B anchored to a second, different bookmarked pin at a corner of object 502 (e.g., corresponding to pin 406B). FIG. 5C illustrates object 502 with manipulator 504C anchored to a bookmarked pin external to object 502 (e.g., corresponding to pin 406C).

In some embodiments, the content creation GUI provides for selecting different bookmarked pins of the object. Selecting among the different bookmarked pins enables a user to quickly transition to different locations to provide a temporary locus of manipulation during scene editing mode (e.g., via the second manipulator element anchored to the selected bookmarked pin). For example, a user can quickly transition from manipulator 504A anchored at pin 506A to manipulator 504B or 504C anchored at pins 506B and 506C (or another bookmarked pin) to provide a different, temporary locus that can be used for rotating, scaling or translating the object among other possible actions, without having to manually move the manipulator between these different positions (which would be more time-consuming). For example, selecting pin 506A and using manipulator 504A for rotation can cause pin 506A to serve as a locus of rotation (e.g., a center or rotation or an axis of rotation) such that object 502 rotates with respect to pin 506A. In a similar manner selecting pins 506B and 506C respectively and using manipulator 504B or 504C respectively for rotation can cause pin 506B or 506C respectively to serve as a temporary locus of rotation (e.g., a center or rotation or an axis of rotation) such that object 502 rotates with respect to pin 506B or 506C respectively. In other words, a first manipulator of a first pin can have a first locus of rotation and a second manipulator of a second pin (different from the first pin) can have a second locus of rotation (different from the first locus of rotation).

Figure 7:
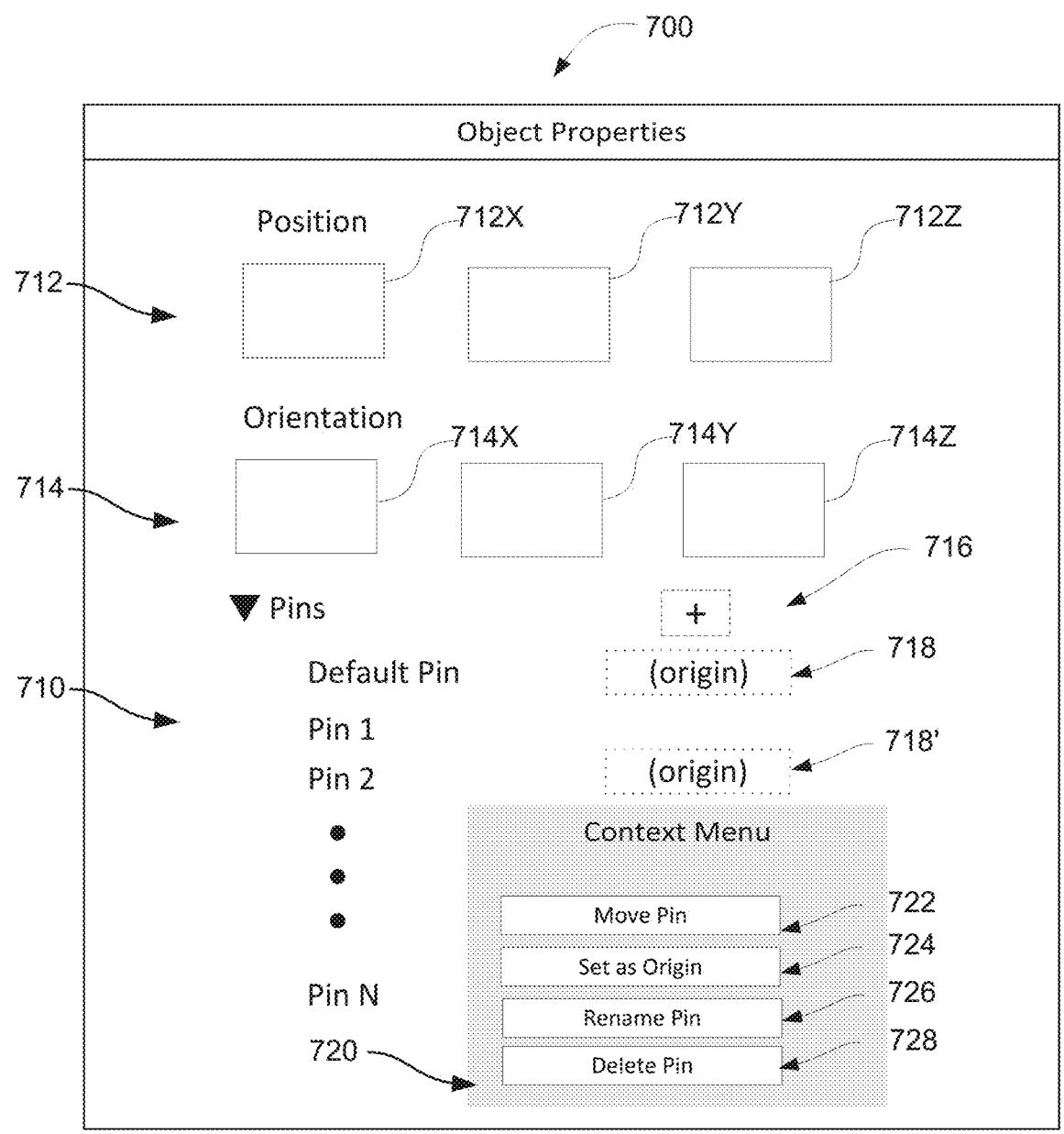
FIG. 7 illustrates an example object properties pane according to some embodiments of the disclosure.

In some embodiments, switching between the bookmarked pins can be achieved using an input in a list of bookmarked pins (as described in more detail with respect to FIG. 7). In some embodiments, a tap gesture on a touch screen or a mouse click on one of the pins in the list of bookmarked pins can be used to select a pin from the list of bookmarked pins. In some embodiments, the tap gesture or mouse click on a pin can toggle from scene editing mode to pin editing mode. A tap and hold gesture (long press) on a touch screen or a mouse click in combination with a shortcut key (control key, shift key, alt key, command key, windows key, function key, etc.) on one of the pins in the bookmarked pins can select the pin. It should be understood that these embodiments are exemplary and other input options are available. In some embodiments, a keyboard shortcut can be used to toggle between pins without need for input to a touch screen/touch pad or mouse.

As described herein, one pin of the bookmarked pins can be defined as an object origin pin. In some embodiments, the object origin can be included as part of the data imported with an object. In some embodiments, the object origin can be a geometric center of the object. In some embodiments, the object origin can be changed to a different pin of the bookmarked pins. A pin set as an object origin can be a locus for actions during runtime of the scene being edited (e.g., for physics based reactions to triggers).

In some embodiments, when an object is first selected, the manipulator is displayed anchored to the object origin. In some embodiments, the manipulator is displayed anchored to the object origin when the object is reselected irrespective of which pin was selected previously for the object. For example, if a first object 302A were selected in the 3D environment, manipulator 304A can be displayed anchored to the object origin of object 302A. Subsequently, if a second object 302B were selected, manipulator 304B can be displayed anchored to the object origin of object 302B (deselecting first object 302A and ceasing display of manipulator 304A). Subsequently, if the first object 302A were reselected, manipulator 304A can again be displayed anchored to the object origin (deselecting second object 302B and ceasing display of manipulator 304B). In such embodiments, the manipulator is anchored to the object origin (e.g., as shown in FIGS. 3 and 5A) when the first object is reselected irrespective of whether another bookmarked pin were selected for the first object prior 302A to selecting the second object 302B (e.g., irrespective of whether pin 506B were selected and manipulator 504B displayed or whether pin 506C were selected and manipulator 504C displayed for object 502). In some embodiments, the manipulator is displayed anchored to the object origin when transitioning back to scene editing mode from pin editing mode while an object remains selected irrespective of which pin of the object was selected previously. For example, if a first object were selected and subsequently pin editing mode were invoked and a different pin selected (e.g., pin 506B or 506C), upon exiting the pin editing mode, the first object is displayed with manipulator 504A anchored to the pin designated as the object origin. In some embodiments, the last used pin of an object is stored and the manipulator is displayed anchored to the last used pin when the object is reselected (or upon exiting pin editing mode). In some embodiments, the last edited pin is stored and the manipulator is displayed anchored to the last edited pin upon exiting pin editing mode. In some embodiments, after transitioning to a different pin (e.g., used as a temporary locus), the manipulator can remain anchored to the different pin until another object is selected, a mode of operation is changed or another pin is selected.

Figures 6A, 6B, 6C:
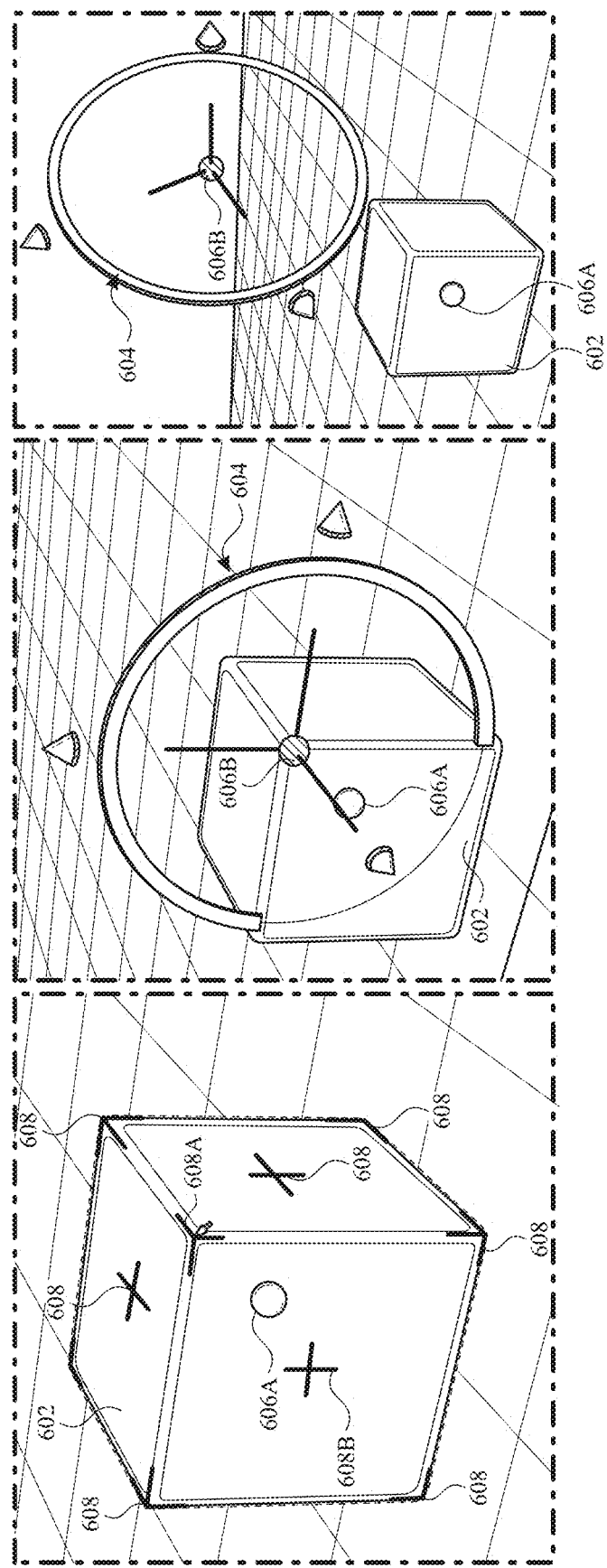
FIGS. 6A-6C illustrate a view of the 3D environment in a second, different mode of operation according to some embodiments of the disclosure.

In some embodiments, the bookmarked pins can be imported with an object into the content creation GUI. In some embodiments, one or more bookmarked pins can be added to an object in the content creation GUI. FIG. 6A-6C illustrate adding a pin according to some embodiments of the disclosure. FIGS. 6A-6C illustrate a view of the 3D environment in a second, different mode of operation (e.g., pin editing mode). In the pin editing mode, the object is displayed including one or more pins. For example, in FIG. 6A object 602 (e.g., corresponding to object 302A, 402, 502) is shown with pin 606A (e.g., corresponding to pin 506A) at the geometric center of object 606A. In some embodiments, in response to an input to add a pin to the object, one or more targets can be displayed overlaid over the object. For example, FIG. 6A illustrates object 602 including multiple targets 608 overlaid over/displayed around object 602, including a target 608A on a corner of object 602 and a target 608B on a face of object 602. In some embodiments, each of the targets are discrete visual elements placed at discrete locations around object 602 (e.g., the elements are not contiguous and do not touch each other). In some embodiments, targets 608 have a plus-sign shape, with planar representation of the target on a planar surface and a non-planar representation of the targets on a non-planar location (e.g., at a corner or other vertex). In some embodiments, targets 608 can be any other shape (e.g., rectangular, square, triangular, circular, oval, etc.).

Actuating one of the targets 608 (e.g., by tapping or clicking, etc.) can cause a new pin to replace the actuated target. For example, FIG. 6B illustrates target 608A replaced with pin 606B (e.g., corresponding to pin 506B). Other bookmarked pins (e.g., pin 606A) can also be concurrently displayed. In some embodiments, manipulator 604 can also be displayed anchored to pin 606B. In some embodiments, actuating one of the targets can additionally cease the display of the remaining targets. In some embodiments, the targets can remain displayed to enable adding multiple pins by actuating other targets, until other input is received (e.g., input to move or otherwise modify a pin or to exit the pin editing mode, etc.). It should be understood that the use of targets for adding pins is an example and adding pins can be done in alternative ways in other embodiments. For example, a user input can add a pin at a location (and optionally with an orientation) specified by the user, specified by the content creation application, or at random in the 3D environment.

In some embodiments, after placing pin 606B (e.g., by actuating target 608A), pin 606B can be modified. For example, pin 606B can be moved to a different position and/or the orientation of pin 606B can be changed. For example, an input can be received to move pin 606B from its initial position to a new position relative to object (e.g., using the ring/arrows of manipulator 606B in pin editing mode). Additionally or alternatively, an input can be received to change an orientation of pin 606B from its original position to define a new local orientation relative to the object (e.g., using the ring of manipulator 606B in pin editing mode). FIG. 6C illustrates pin 606B moved from its initial position on the corner of object 602 to a new position external to object 602 in the 3D environment and with a new orientation relative to object 602. The position and/or the local orientation can be stored for the pin and can be recalled when the pin is selected for use as a temporary locus in scene editing mode.

As described herein, the content creation GUI can include information about object properties. The object properties can include location information of the object (or pins), orientation information of the object (or pins) and/or pin information of the bookmarked pins associated with the object. In some embodiments, the information can be represented in an object properties pane (or other window). In some embodiments, the object properties pane can be displayed concurrently with the 3D environment.

FIG. 7 illustrates an example object properties pane 700 according to some embodiments of the disclosure. In some embodiments, object properties pane 700 includes a list 710 of bookmarked pins corresponding to a selected object (list shown expanded in FIG. 7). In some embodiments, object properties pane 700 includes a representation 712 of position. In some embodiments, representation 712 of position can include 3D coordinates including an X coordinate 712X, Y coordinate 712Y and Z coordinate 712Z. In a pin editing mode, position can represent the position of a selected pin relative to the object (e.g., corresponding to the object origin). In a scene editing mode (or prior to the selection of a pin in the pin editing mode), the position can represent the position of the object (e.g., corresponding to the object origin) in the 3D environment. In some embodiments, object properties pane 700 includes a representation 714 of orientation. In some embodiments, representation 714 of orientation can include 3D coordinates including an X coordinate 714X, Y coordinate 714Y and Z coordinate 714Z. In a pin editing mode, representation 714 of orientation can represent the local orientation of a selected pin in the 3D environment relative to the object. In a scene editing mode (or prior to the selection of a pin in the pin editing mode), the representation 714 of orientation can represent the orientation of the object in the 3D environment. The manipulator illustrated can be anchored to the position shown in object properties pane 700 and/or oriented according to the orientation shown in object properties pane 700.

List 710 of pins can show the bookmarked pins associated with an object. In some embodiments, an input to select one of the pins (e.g., tap, or clicking or other input) can invoke a context menu 720 including user interface elements 722-728 (e.g., buttons) to perform actions associated with the pin. The actions can include, in some embodiments, moving a pin (to change the position and/or orientation of the selected pin), setting a pin as the object origin, renaming a pin and/or deleting a pin. It should be understood that more, fewer and/or different actions are possible than the examples illustrated in FIG. 7.

For example, after displaying context menu 720, an input to actuate (e.g., tap, click, etc.) user interface element 722 can be used to change the location and/or the orientation of the respective pin (e.g., as illustrated, for example, by the movement of pin 606B from the corner of object 602 in FIG. 6B to an position outside of object 602 in FIG. 6C).

For example, after displaying context menu 720, an input to actuate (e.g., tap, click, etc.) user interface element 724 can be used to designate the respective pin as the origin of the object. In some embodiments, an object can be imported with a pin corresponding to the object origin as a default. This pin (labeled "default pin") can be indicated as the object origin by tag 718 ("origin") in list 710 by default. In some embodiments, the tag indicating the object origin can be displayed once there are multiple pins or once the process to add a second pin is started. In some embodiments, in response to the actuation of user interface element 724, the object origin tag can be moved to the selected pin. For example, if "pin 2" were selected, the object origin tag can be moved to "pin 2" as illustrated by tag 718' (ceasing to display tag 718 by the default pin or previously designated object origin pin).

For example, after displaying context menu 720, an input to actuate (e.g., tap, click, etc.) user interface element 726 can be used to rename the respective pin. Renaming the pin can change the name of the pin appearing in list 710 from a generic name (e.g., pin [number]) to a more meaningful name. As a result, the pin can provide, for example, contextual information about the location, orientation and/or purpose of the pin for reference, as opposed to referencing the pins more generically (e.g., by number).

For example, after displaying context menu 720, an input to actuate (e.g., tap, click, etc.) user interface element 728 can be used to delete the respective pin. Deleting the pin can remove the pin from list 710. For example, the pin may be useful for a content creator designing the object or for certain types of scenes, but may be unnecessary for downstream or other users or for certain applications or types of scenes. Removing these pins can reduce the number of bookmarked pins where such pins are unneeded, reducing clutter on the user interface and making it easier to switch between the necessary bookmarked pins.

Object properties pane 700 can include a user interface element 716 for adding pins to the list of pins. In some embodiments, actuating user interface element 716 can trigger pin editing mode and the display of targets 608 as shown in FIG. 6A. In some embodiments, actuating user interface element 716 can place a pin associated with the object in the 3D environment (as random or as defined by the content creation GUI) or request input coordinates for placement of the pin and/or request input coordinates for the local orientation of the pin. In some embodiments, the location and/or orientation coordinates can be entered in representation 712 of the position and/or representation 714 of the orientation. In some embodiments, actuating user interface element 716 can also expand list 710 if list 710 is collapsed.

As described above, in some embodiments, the content creation GUI can transition from the scene editing mode to the pin editing mode in response to actuating user interface element 716. In some embodiments, selecting a pin in list 710 (e.g., by tap, click, etc.) can also transition the content creation GUI from the scene editing mode to the pin editing mode. In some embodiments, the content creation GUI can transition from the scene editing mode to the pin editing mode via a menu, toggle or shortcut, among other possibilities. In some embodiments, the transition from pin editing mode to scene editing mode can be achieved via a menu, toggle or shortcut among other possibilities. In some embodiments, the transition from pin editing mode to scene editing mode can be achieved by selecting one of the objects in the 3D environment (e.g., the selected object or another object). In some embodiments, the transition from pin editing mode to scene editing mode can be achieved by collapsing list 710.

Figure 8A:
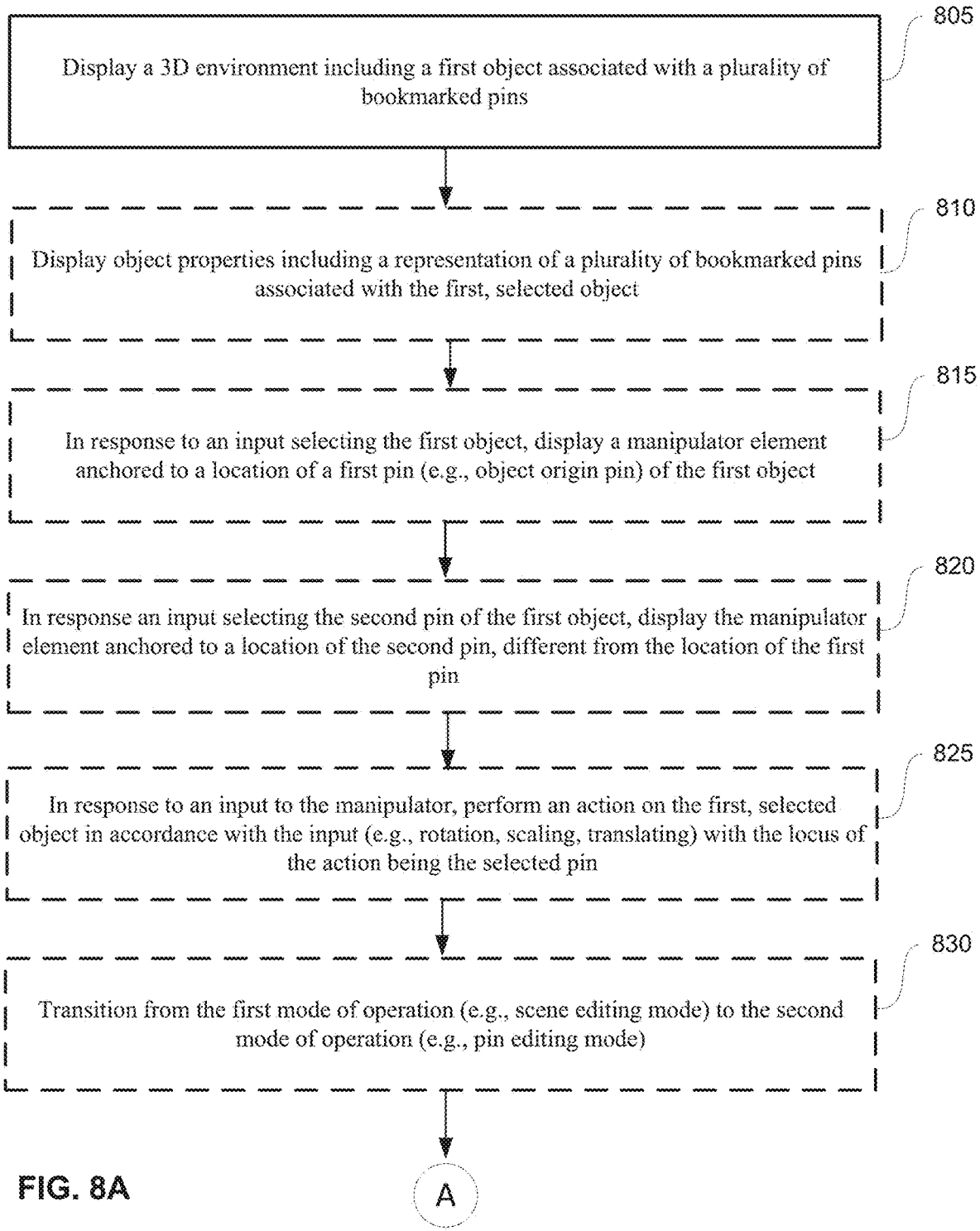
FIGS. 8A-8B illustrate a flow diagram illustrating a process for a user interface including an object associated with bookmarked pins according to some embodiments of the disclosure.
Figure 8B:
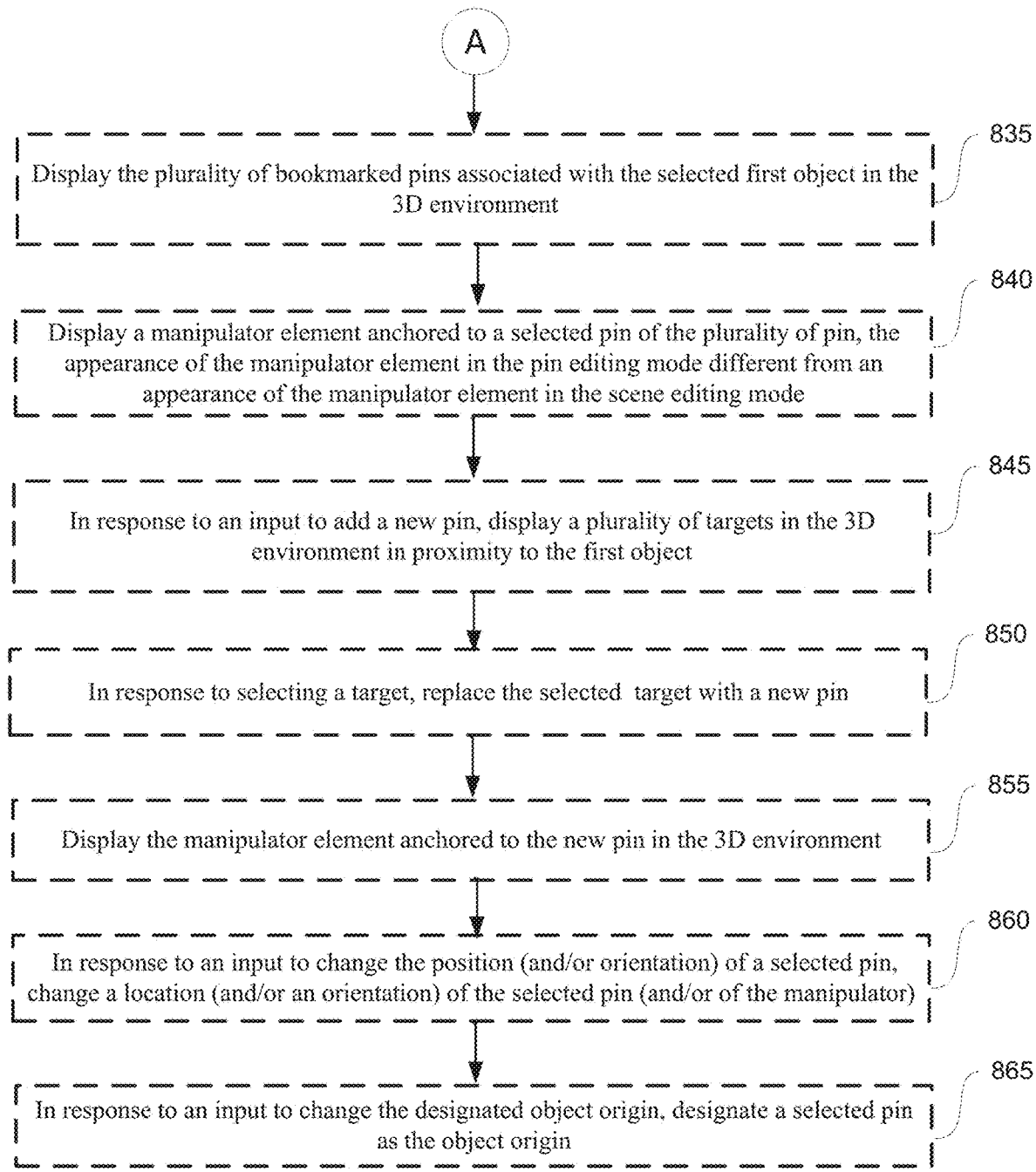

FIGS. 8A-8B illustrate a flow diagram illustrating a process 800 for a user interface (e.g., a content creation GUI) including an object associated with bookmarked pins in accordance with some embodiments of the disclosure. Process 800 includes, at 805, displaying a representation of a 3D environment including one or more objects (e.g., 3D computer generated objects). The one or more objects include a first object associated with a plurality of bookmarked pins including a first pin and a second pin. The plurality of bookmarked pins are selectable to display a manipulator element corresponding to a selected pin. In some embodiments, process 800 optionally includes displaying (e.g., concurrently with the 3D environment), at 810, object properties (e.g., in a pane in the GUI) including one or more properties of a selected object. The object properties optionally include a representation of a plurality of bookmarked pins associated with the selected object. In some embodiments, the object properties displayed can include location and/or orientation information.

In some embodiments, the appearance of the first object (and/or pins and/or manipulator) in the display depends on a mode of operation such that the appearance is different in a first mode of operation (a scene and/or object editing mode) and in a second mode of operation (a pin editing mode). For example, in a scene editing mode, the plurality of bookmarked pins may not be displayed, but a manipulator anchored to a selected or default pin may be displayed. For example, at 815, in response to an input selecting the first object (or reselecting the first object, or optionally upon exiting the pin editing mode), process 800 can include displaying a manipulator element anchored to a location of the first pin (e.g., object origin pin of the plurality of bookmarked pins) of the first object. At 820, in response to an input selecting the second pin of the plurality of bookmarked pins associated with the first object (different from the first pin), process 800 can include displaying the manipulator element anchored to a location of the second pin, different from the location of the first pin. Thus, selecting a different pin of the plurality of bookmarked pins can shift the manipulator to a different locus (e.g., ceasing to display the manipulator at the location of the first pin). At 825, in response to an input to the manipulator (whether displayed at the location of the first pin or at the location of the second pin), process 800 can include performing an action on the object in accordance with the input (e.g., rotation, scaling, translating) with the locus of the action being the selected pin.

Process 800 can include, at 830, transitioning from the first mode of operation (e.g., scene or object editing mode) to the second mode of operation (e.g., pin editing mode). In some embodiments, transitioning between the modes can be triggered by selection of a pin in a representation of the plurality of bookmarked pins or by an input to add a pin to the representation of the plurality of bookmarked pins. In pin editing mode, in some embodiments, process 800 includes, at 835, displaying the plurality of bookmarked pins associated with the selected first object in the 3D environment. Additionally or alternatively, process 800 includes, at 840, displaying a manipulator element anchored to a selected pin of the plurality of pins. The appearance of the manipulator element in the pin editing mode is different from an appearance of the manipulator element in the scene editing mode, in some embodiments.

The plurality of bookmarked pins associated with the object can be modified. The modifications can include adding pins, deleting pins, moving pins, renaming pins and/or designating a pin as the object origin. In some embodiments, at 845, the process can further include displaying a plurality of targets in the 3D environment in proximity to (e.g., overlaid over or displayed around) the first object in response to an input to add a new pin. In some embodiments, at 850, the process 800 can further include replacing a selected/actuated target with a new pin (and optionally the new pin can be added to a representation of a plurality of bookmarked pins) in response to selecting/actuating the target. In some embodiments, at 855, process 800 can include displaying the manipulator element anchored to the new pin in the 3D environment. In some embodiments, at 860, process 800 can further include changing a location (and/or an orientation) of a selected pin (and/or the manipulator) in response to an input to change the position (and/or orientation) of the pin. In some embodiments, at 865, process 800 can further include designating a selected pin as the object origin (e.g., for run-time actions) from a previously designated object origin (e.g., an imported pin and/or geometric center pin) in response to an input to change the designated object origin.

It is understood that process 800 is an example and that more, fewer, or different operations can be performed in the same or in a different order. Additionally, the operations in process 800 described above are, optionally, implemented by running one or more functional modules in an information processing apparatus such as general-purpose processors (e.g., as described with respect to FIG. 2) or application specific chips, and/or by other components of FIG. 2.

Although the description above primarily focuses on one selected object and its associated bookmarked pins, it should be understood that multiple objects in a computer graphics editing environment can have common associated bookmarked pins. In some embodiments, an object with a set of associated bookmarked pins can be duplicated in the 3D environment or multiple instantiations of the same object can be otherwise invoked within the 3D environment. The duplicate objects can each have the same set of associated bookmarked pins. For example, referring back to FIG. 3, objects 302A-302D can, in some embodiments, represent the same object type with the same associated bookmarked pins. For example, object 302A can have multiple bookmarked pins (e.g., N+1 pins illustrated in list 710). Duplicating object 302A with its bookmarked pins (or otherwise instantiating multiple versions of object 302A) to create objects 302B-302D can result in objects 302B-302D each having the same bookmarked pins. It should be understood that objects 302A-302D in FIG. 3 may be different objects with different pins in other embodiments.

In some embodiments, selecting multiple instantiations of an object with the same bookmarked pins simultaneously can allow for simultaneous manipulation of the multiple objects via the shared bookmarked pins. For example, referring back to FIG. 3, objects 302A-302D can represent four instantiations of the same object type with the same bookmarked pins. When objects 302A-302D are selected simultaneously, a manipulator can be displayed anchored to a pin and input to the manipulator can result in transformation for each of the objects with respect to the corresponding shared pin for each respective object (without requiring independent manipulators and inputs to perform the same transformation to each of the objects individually). For example, while objects 302A-302D are simultaneously selected a manipulator 304A can be displayed anchored to a pin (e.g., the object origin) of object 203A. A rotation input to manipulator 304A can result in rotation of each of objects 302A-302D about their object origin pin. In some examples, the manipulator can be moved to a different bookmarked pin as a temporary locus of action for the simultaneously selected objects. In some embodiments, the same behavior (manipulation of multiple objects using a shared pin/locus of one of the objects) can be achieved for simultaneously selected objects of different type and having different pins as long as the objects include a shared bookmarked pin and the shared bookmark pin is selected as the temporary locus of action. For example, each of objects 302A-302D can be different objects including one or more shared bookmarked pins (e.g., different shapes each having an object origin pin at a geometric center, different characters each having a pin for a hand, or head, or other body part, etc.) that can be used to perform a common action (e.g., rotation, turning the head, lifting a hand, etc.) using the shared pin as a locus for the action with respect to each of the selected objects, via input to a manipulator anchored to the shared bookmarked pin of one of the selected objects.

Therefore, according to the above, some embodiments of the disclosure are directed to a method. The method can comprise: at an electronic device in communication with a display generation component (e.g., a display): displaying, using the display generation component, a computer graphics editing environment including one or more representations of one or more three dimensional (3D) objects. A first object of the one or more 3D objects can be associated with a first plurality of bookmarked pins including a first pin and a second pin. The first plurality of bookmarked pins are selectable to display a manipulator element corresponding to a selected pin. Additionally or alternatively to the embodiments disclosed above, in some embodiments, the method can further comprise: receiving a first input selecting the first object; and in response to the first input, displaying a first manipulator element anchored to a location of the first pin. The first pin can be designated as an origin of the first object among the first plurality of bookmarked pins. Additionally or alternatively to the embodiments disclosed above, in some embodiments, the method can further comprise: while displaying the first manipulator element, receiving a second input selecting the second pin of the first plurality of bookmarked pins associated with the first object; and in response to the second input, displaying a second manipulator element anchored to a location of the second pin, different from the location of the first pin, and ceasing to display the first manipulator element anchored to the location of the first pin. Additionally or alternatively to the embodiments disclosed above, in some embodiments, the second pin can provide a temporary locus of manipulation of the first object via the second manipulator element. Additionally or alternatively to the embodiments disclosed above, in some embodiments, the method can further comprise: while displaying the second manipulator element and while the first object remains selected, receiving a third input to switch from a first mode of operation to a second mode of operation; in response to the third input, switching from the first mode of operation to the second mode of operation; while in the second mode of operation, receiving a fourth input to switch from the second mode of operation to the first mode of operation; and in response to the fourth input, displaying the first manipulator element anchored to the location of the first pin. Additionally or alternatively to the embodiments disclosed above, in some embodiments, the method can further comprise: while displaying the second manipulator element, receiving a third input to select a second object different from the first object; in response to the third input, displaying a manipulator element anchored to a location of a pin of the second object; after the second object is selected, receiving a fourth input reselecting the first object; and in response to the fourth input, displaying the first manipulator element anchored to the location of the first pin of the first object, and ceasing to display the manipulator element anchored to the location of the pin of the second object. Additionally or alternatively to the embodiments disclosed above, in some embodiments, the method can further comprise: in response to the third input, ceasing to display the second manipulator element anchored to the location of the second pin of the first object. Additionally or alternatively to the embodiments disclosed above, in some embodiments, the first pin and the second pin are not displayed while the first manipulator element or the second manipulator element are displayed. Additionally or alternatively to the embodiments disclosed above, in some embodiments, the method can further comprise: displaying, using the display generation component, an object properties pane including one or more properties of a selected object in the computer graphics editing environment. The one or more properties of the selected object in the computer graphics editing environment can include a representation of a plurality of bookmarked pins associated with the selected object. Additionally or alternatively to the embodiments disclosed above, in some embodiments, the one or more properties of the selected object can include a representation of a 3D location. In a first mode of operation, the representation of the 3D location can correspond to a position of the selected object in the computer graphics editing environment corresponding to a pin of the selected object designated as an origin of the selected object; and in a second mode of operation, the representation of the 3D location can correspond to a position of a selected pin of the selected object relative to a position of the selected object corresponding to the pin of the selected object designated as the origin of the selected object. Additionally or alternatively to the embodiments disclosed above, in some embodiments, the one or more properties of the selected object can include a representation of a 3D orientation. In a first mode of operation, the representation of the 3D orientation can correspond to an orientation of the manipulator element displayed in the computer graphics editing environment; and in a second mode of operation, the representation of the 3D orientation can correspond to a local orientation of a selected pin of the selected object relative to the selected object. Additionally or alternatively to the embodiments disclosed above, in some embodiments, the method can further comprise: receiving an input to add a third pin to the plurality of bookmarked pins associated with the first object; and in response to the input to add the third pin, adding the third pin to the first plurality of bookmarked pins associated with the first object. Additionally or alternatively to the embodiments disclosed above, in some embodiments, the method can further comprise: displaying, using the display generation component, a user interface element for adding a pin. Receiving the input to add the third pin to the first plurality of bookmarked pins associated with the first object can comprise actuating the user interface element for adding the pin. Additionally or alternatively to the embodiments disclosed above, in some embodiments, the method can further comprise: in response to actuating the user interface element for adding the pin, displaying in the computer graphics editing environment a plurality of targets in proximity to the first object and displaying the first plurality of bookmarked pins associated with the first object in the computer graphics editing environment relative to the first object. The input to add the third pin can further comprise receiving an input selecting a target of the plurality of targets. The method can further comprise: in response to the input selecting the target, ceasing to display the plurality of targets and displaying the third pin at a located in the computer graphics editing environment corresponding to the selected target. Additionally or alternatively to the embodiments disclosed above, in some embodiments, the method can further comprise: in response to the input to add the third pin: displaying a representation of the first plurality of bookmarked pins associated with the first object including the first pin, the second pin and the third pin; and displaying a manipulator element anchored to the third pin. Additionally or alternatively to the embodiments disclosed above, in some embodiments, the method can further comprise: receiving an input to change a location or an orientation of a respective pin of the first plurality of bookmarked pins; and in response to an input to change a location or orientation of the respective pin, changing the location or the orientation of the respective pin. Additionally or alternatively to the embodiments disclosed above, in some embodiments, the method can further comprise: receiving an input to designate a respective pin of the first plurality of bookmarked pins as an origin of the first object; and in response to an input to designate a respective pin as the origin of the first object, designating the respective pin as the origin of the first object. Additionally or alternatively to the embodiments disclosed above, in some embodiments, the method can further comprise: receiving an input to rename a respective pin of the first plurality of bookmarked pins; and in response to an input to rename the respective pin, renaming the respective pin. Additionally or alternatively to the embodiments disclosed above, in some embodiments, the method can further comprise: receiving an input to delete a respective pin of the first plurality of bookmarked pins; and in response to an input to delete the respective pin, delete the respective pin from the first plurality of bookmarked pins. Additionally or alternatively to the embodiments disclosed above, in some embodiments, the method can further comprise: while the first object is selected and while displaying a first manipulator element anchored to an object origin of the first object, receiving an input to switch from a first mode of operation to a second mode of operation; and in response to the input to switch from the first mode of operation to a second mode of operation, displaying the first plurality of bookmarked pins associated with the first object in the computer graphics editing environment and displaying a second manipulator element anchored to one of the first plurality of bookmarked pins. An appearance of the second manipulator element can be different from an appearance of the first manipulator element. Additionally or alternatively to the embodiments disclosed above, in some embodiments, the input to switch from the first mode of operation to a second mode of operation can comprise a selection of a respective pin in a representation of the first plurality of bookmarked pins. Additionally or alternatively to the embodiments disclosed above, in some embodiments, the first plurality of bookmarked pins can include at least one pin internal to the first object and at least one pin external to the first object or on a surface of the first object. Additionally or alternatively to the embodiments disclosed above, in some embodiments, a second object of the one or more 3D objects can be associated with a second plurality of bookmarked pins. The first plurality of bookmarked pins and the second plurality of bookmarked pins can include a shared pin. The method can further comprise: receiving a first input selecting the first object and the second object; in response to the first input, displaying a manipulator element anchored to a location of the shared pin of the first object; while displaying the manipulator element, receiving a second input to the manipulator element; and in response to the second input, transforming the first object and the second object in accordance to the second input with reference to the shared pin for each respective object.

Some embodiments of the disclosure are directed to a non-transitory computer readable storage medium. The non-transitory computer readable storage medium can store instructions (e.g., one or more programs), which when executed by an electronic device including one or more processors can cause the electronic device to perform any of the above methods. Some embodiments of the disclosure are directed to an electronic device. The electronic device can be in communication with a display generation component. The electronic device can comprise one or more processors, memory (e.g., a non-transitory computer readable storage medium), and one or more programs. The one or more programs can be stored in the memory and can be configured to be executed by the one or more processors. The one or more programs can include instructions for performing any of the above methods.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

The invention claimed is:

1. A method, comprising:
   at an electronic device in communication with a display:
      displaying, using the display, a computer graphics editing environment including one or more representations of one or more three dimensional (3D) objects, wherein a first object of the one or more 3D objects is associated with a first plurality of bookmarked pins including a first pin and a second pin, wherein the first plurality of bookmarked pins are selectable to display a manipulator element corresponding to a selected pin of the first plurality of bookmarked pins in a first mode or in a second mode, and wherein the first plurality of bookmarked pins are displayed in the second mode; and while in the first mode:
  receiving a first input selecting the first object; and
  in response to receiving the first input, displaying a first manipulator element, different from the first pin and the first object, anchored to a location of the first pin;
  wherein the first pin is designated as an origin of the first object among the first plurality of bookmarked pins.

2. The method of claim 1, further comprising:
while displaying the first manipulator element, receiving a second input selecting the second pin of the first plurality of bookmarked pins associated with the first object; and
in response to receiving the second input, displaying a second manipulator element anchored to a location of the second pin, different from the location of the first pin, and ceasing to display the first manipulator element anchored to the location of the first pin.

3. The method of claim 2, wherein the second pin provides a temporary locus of manipulation of the first object via the second manipulator element.

4. The method of claim 2, further comprising: while displaying the second manipulator element and while the first object remains selected, receiving a third input to switch from a first mode of operation to a second mode of operation;
in response to receiving the third input, switching from the first mode of operation to the second mode of operation;
while in the second mode of operation, receiving a fourth input to switch from the second mode of operation to the first mode of operation; and
in response to receiving the fourth input, displaying the first manipulator element anchored to the location of the first pin.

5. The method of claim 4, further comprising: in response to receiving the third input, ceasing to display the second manipulator element anchored to the location of the second pin of the first object.

6. The method of claim 2, further comprising:
while displaying the second manipulator element, receiving a third input to select a second object different from the first object;
in response to receiving the third input, displaying a third manipulator element anchored to a location of a pin of the second object;
after the second object is selected, receiving a fourth input reselecting the first object; and
in response to receiving the fourth input, displaying the first manipulator element anchored to the location of the first pin of the first object, and ceasing to display the third manipulator element anchored to the location of the pin of the second object.

7. The method of claim 2, wherein the first pin and the second pin are not displayed while the first manipulator element and the second manipulator element are displayed.

8. The method of claim 1, further comprising:
displaying, using the display, an object properties pane including one or more properties of a selected object in the computer graphics editing environment, the one or more properties of the selected object in the computer graphics editing environment including a representation of a plurality of bookmarked pins associated with the selected object.

9. The method of claim 8, wherein the one or more properties of the selected object include a representation of a 3D location, wherein:
  in a first mode of operation, the representation of the 3D location corresponds to a position of the selected object in the computer graphics editing environment corresponding to a pin of the selected object designated as an origin of the selected object; and
  in a second mode of operation, the representation of the 3D location corresponds to a position of the selected pin of the selected object relative to the position of the selected object corresponding to the pin of the selected object designated as the origin of the selected object.

10. The method of claim 8, wherein the one or more properties of the selected object include a representation of a 3D orientation, wherein:
  in a first mode of operation, the representation of the 3D orientation corresponds to an orientation of the manipulator element displayed in the computer graphics editing environment; and
  in a second mode of operation, the representation of the 3D orientation corresponds to a local orientation of a first selected pin of the selected object relative to the selected object.

11. The method of claim 1, further comprising:
receiving an input to add a third pin to the first plurality of bookmarked pins associated with the first object; and
in response to receiving the input to add the third pin, adding the third pin to the first plurality of bookmarked pins associated with the first object.

12. The method of claim 11, further comprising:
displaying, using the display, a user interface element for adding a new pin;
wherein receiving the input to add the third pin to the first plurality of bookmarked pins associated with the first object comprises actuating the user interface element for adding the new pin.

13. The method of claim 12, further comprising:
in response to actuating the user interface element for adding the new pin, displaying in the computer graphics editing environment a plurality of targets in proximity to the first object and displaying the first plurality of bookmarked pins associated with the first object in the computer graphics editing environment relative to the first object, wherein the input to add the third pin further comprises receiving a first input selecting a target of the plurality of targets; and
in response to receiving the input selecting the target of the plurality of targets, ceasing to display the plurality of targets and displaying the third pin at a location in the computer graphics editing environment corresponding to the selected target.

14. The method of claim 11, further comprising:
in response to receiving the input to add the third pin:
  displaying a representation of the first plurality of bookmarked pins associated with the first object including the first pin, the second pin and the third pin; and displaying a second manipulator element anchored to the third pin.

15. The method of claim 1, further comprising:
receiving an input to change a location or an orientation of a respective pin of the first plurality of bookmarked pins; and
in response to receiving the input to change the location or the orientation of the respective pin, changing the location or the orientation of the respective pin.

16. The method of claim 1, further comprising:
receiving an input to designate a respective pin of the first plurality of bookmarked pins as the origin of the first object; and
in response to receiving the input to designate the respective pin as the origin of the first object, designating the respective pin as the origin of the first object.

17. The method of claim 1, further comprising:
receiving an input to rename a respective pin of the first plurality of bookmarked pins; and
in response to receiving the input to rename the respective pin, renaming the respective pin.

18. The method of claim 1, further comprising:
receiving an input to delete a respective pin of the first plurality of bookmarked pins; and
in response to receiving the input to delete the respective pin, delete the respective pin from the first plurality of bookmarked pins.

19. The method of claim 1, further comprising:
while the first object is selected and while displaying the first manipulator element anchored to the origin of the first object, receiving an input to switch from a first mode of operation to a second mode of operation; and
in response to receiving the input to switch from the first mode of operation to the second mode of operation, displaying the first plurality of bookmarked pins associated with the first object in the computer graphics editing environment and displaying a second manipulator element anchored to one of the first plurality of bookmarked pins, wherein an appearance of the second manipulator element is different from an appearance of the first manipulator element.

20. The method of claim 19, wherein the input to switch from the first mode of operation to the second mode of operation comprises a selection of a respective pin in a representation of the first plurality of bookmarked pins.

21. The method of claim 1, wherein the first plurality of bookmarked pins includes at least one first pin internal to the first object and at least one second pin external to the first object or on a surface of the first object.

22. The method of claim 1, wherein a second object of the one or more 3D objects is associated with a second plurality of bookmarked pins, wherein the first plurality of bookmarked pins and the second plurality of bookmarked pins include a shared pin, the method further comprising:
receiving a second input selecting the first object and the second object;
in response to receiving the second input selecting the first object and the second object, displaying a second manipulator element anchored to a location of the shared pin of the first object;
while displaying the second manipulator element, receiving a third input to the second manipulator element anchored to the location of the shared pin of the first object; and
in response to receiving the third input to the second manipulator element anchored to the location of the shared pin of the first object, transforming the first object and the second object in accordance with the third input to the second manipulator element anchored to the location of the shared pin of the first object with reference to the shared pin for each respective object.

23. A non-transitory computer readable storage medium storing instructions, which when executed by one or more processors, cause the one or more processors to perform operations comprising:
displaying, using a display, a computer graphics editing environment including one or more representations of one or more three dimensional (3D) objects, wherein a first object of the one or more 3D objects is associated with a first plurality of bookmarked pins including a first pin and a second pin, wherein the first plurality of bookmarked pins are selectable to display a manipulator element corresponding to a selected pin in a first mode or in a second mode, and wherein the first plurality of bookmarked pins are displayed in the second mode;
receiving an input to designate a first respective pin of the first plurality of bookmarked pins as an origin of the first object;
in response to receiving the input to designate the first respective pin of the first plurality of bookmarked pins as the origin of the first object, designating the first respective pin as the origin of the first object; and
while in the first mode:
receiving an input to select a second respective pin, different from the first pin;
in response to receiving the input to select the second respective pin, displaying the manipulator element anchored to a location of the second respective pin;
while the manipulator element is displayed anchored to the location of the second pin or while a second object is selected, receiving an input selecting the first object; and
in response to receiving the input to select the first object, displaying the manipulator element anchored to the location of the first pin and ceasing to display the manipulator element anchored to the location of the second respective pin.

* * * * *